United States Patent
Benda

[11] Patent Number: 5,823,023
[45] Date of Patent: Oct. 20, 1998

[54] LOCKING DEVICE FOR A VALVE

[75] Inventor: Steven J. Benda, Cokato, Minn.

[73] Assignee: Brady USA, Inc., Milwaukee, Wis.

[21] Appl. No.: 959,885

[22] Filed: Oct. 29, 1997

[51] Int. Cl.[6] .................................................. F16K 35/00
[52] U.S. Cl. ................................ 70/180; 137/385; 70/175
[58] Field of Search ..................... 70/175–180, 163–173; 137/382–385

[56] References Cited

U.S. PATENT DOCUMENTS

| | | | |
|---|---|---|---|
| 1,993,784 | 3/1935 | Henderson | 70/180 |
| 2,748,589 | 6/1956 | Hulslander | 70/180 |
| 2,748,794 | 6/1956 | Dodds | 70/180 X |
| 4,788,840 | 12/1988 | Wilson, Jr. | 70/164 |
| 5,161,568 | 11/1992 | Turvey | 137/383 |
| 5,188,335 | 2/1993 | Pettinaroli | 70/180 X |
| 5,568,952 | 10/1996 | Ruegg | 292/307 X |
| 5,638,857 | 6/1997 | Alcumbrack | 137/377 |
| 5,649,437 | 7/1997 | Royka, Jr. et al. | 70/180 X |
| 5,664,447 | 9/1997 | Neeley | 70/175 |

Primary Examiner—Suzanne Dino Barrett
Attorney, Agent, or Firm—Quarles & Brady

[57] ABSTRACT

An air regulator valve has a knob which is slidable between a locked position in which it engages teeth on the end of a valve bushing and an unlocked position in which it can be rotated about the valve bushing to rotate the valve shaft. A lock tab is fastened to the end of the shaft and extends through an opening in the knob. The knob is locked in the down position by passing a padlock shackle through an opening in the lock tab.

7 Claims, 3 Drawing Sheets

LOCKING DEVICE FOR A VALVE

BACKGROUND OF THE INVENTION

The field of the invention is the control of rotary actuated regulating valves used for the flow of liquids and gases, and particularly, devices for locking such valves.

In many industrial settings valves are used to control the flow of liquids and gases. Many of these valves are manually operated by rotating a knob through a range of valve settings between a fully opened position and a fully closed position. Since valve settings can be critical to the proper and safe operation of machinery, many valves are locked, or secured, after being set to provide the proper system conditions, such as flow and pressure.

There are many ways for locking a rotatable valve. The most common method is to enclose the valve and provide a lockable door or cover to the enclosure. Such methods are limited due to space considerations plus the valve may not be lockable due to its large or unusual geometry. Another method is to provide a lockable restraining device that engages the valve knob. This can be as simple as a chain or bar that engages the knob and is anchored to surrounding structures, or it can be a complex device such as that disclosed in U.S. Pat. No. 5,664,447.

SUMMARY OF THE INVENTION

The present invention is a locking device which is formed as part of the actuating knob which engages a rotatable valve shaft. More specifically, the invention is an improvement to a valve having a rotatable shaft and surrounding bushing which includes a lock tab formed on the end of the shaft and having a lock opening therein; a knob having a top wall and a surrounding skirt, the knob having a tab opening in the top wall which enables the knob to be placed over the bushing with the lock tab extending through the tab opening; a lip formed on the skirt and extending radially inward therefrom to engage the valve bushing; a detent formed on the valve bushing and engaging the lip to retain the knob on the valve bushing in either a locked or unlocked position; teeth formed on the end of the valve bushing; and ribs formed on the underside of the top wall and aligned to engage the valve bushing teeth when the knob is in its locked position. When the knob is in its unlocked position, it is free to rotate the shaft and operate the valve. When pushed to its locked position, the valve bushing teeth engage the ribs and the knob and valve shaft are locked in their current setting. A padlock shackle can be inserted in the lock opening which clears the top wall of the knob and this blocks the knob from being pulled to its unlocked position.

A general object of the invention is to enable a valve to be locked at any setting. The shaft can be rotated freely to any valve setting. The knob is then pushed to snap it into engagement with the valve bushing stationary teeth and it is locked at this setting by passing a padlock shackle through the lock opening.

Another object of the invention is to provide an economical and uncomplicated lock-out system for a valve. By extending the rotary shaft in the form of a lock tab through the top wall of the knob and attaching the knob by a snap fit to the valve bushing for translational motion between a locked and unlocked position, the knob and shaft can be firmly locked in any setting by engagement with the teeth formed on the end of the valve bushing.

Yet another object of the invention is to provide a lock mechanism for a conventional valve. The lock tab may be formed as part of a linkage element that can be fastened to the end of a conventional valve shaft. The lip on the knob cooperates with a retainer ring and snap ring formed around the valve bushing to form the detent mechanism.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
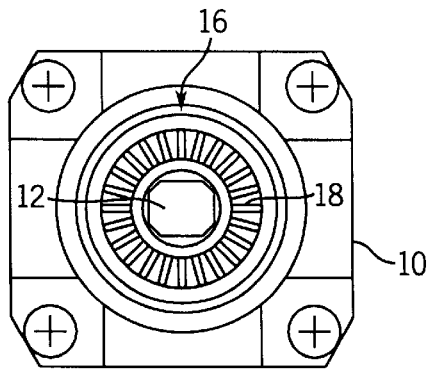
FIG. 1 is a top view of an air regulator valve to which the present invention may be applied.
Figure 2:
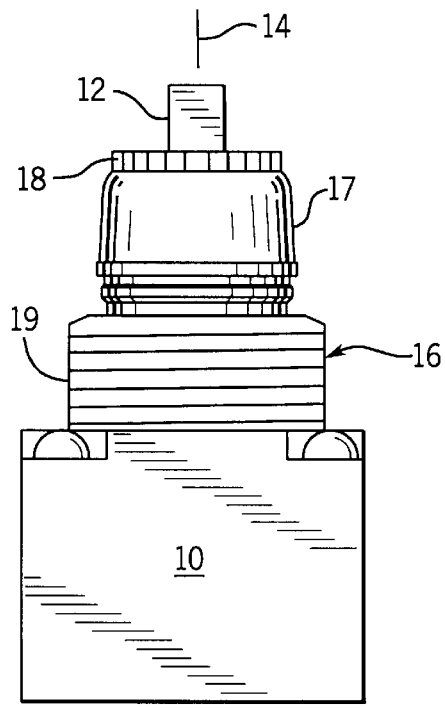
FIG. 2 is an elevation view of the air regulator valve of FIG. 1.

Referring particularly to FIGS. 1 and 2, an air regulator valve has a rectangular shaped valve body 10 which houses the valve and provides the connections to the input and output ports of the valve (not shown in the drawings). The valve is operated by a valve shaft 12 which extends out one side of the valve body 10 and is rotatable about an axis 14 to operate the valve. A threaded valve bushing 16 also extends from the valve body 10 and is concentric about the axis of rotation 14. This valve bushing 16 may be inserted through an opening in a control panel and is fastened thereto with a nut (not shown in the drawings). The valve bushing 16 has a cylindrical shaped segment 17 that extends beyond the threaded portion 19 and a set of radially directed teeth 18 are formed on its end. The teeth 18 are integrally molded with the valve bushing 16 and form an annular ring around the valve shaft 12. The valve shaft 12 may be rotated to set the valve at a desired operating point between a fully open and fully closed position.

Figure 3:
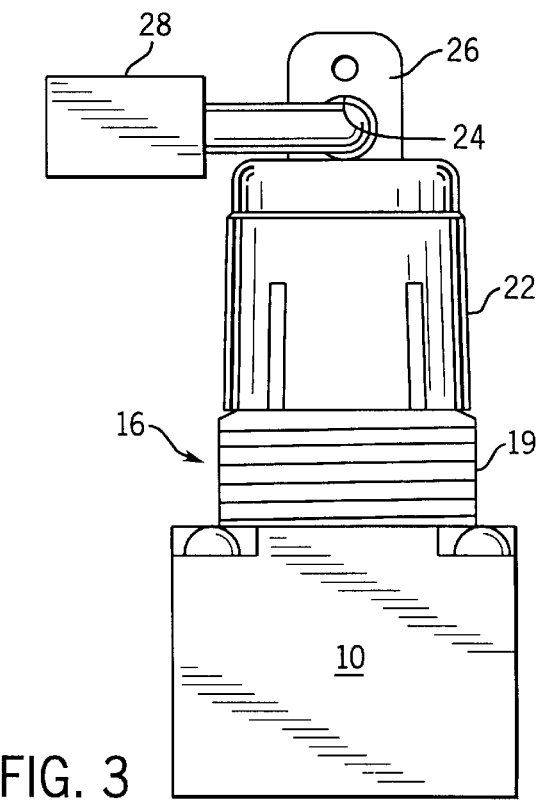
FIG. 3 is an elevation view of the air regulator valve of FIG. 1 with the preferred embodiment of the locking device applied.
Figure 4:
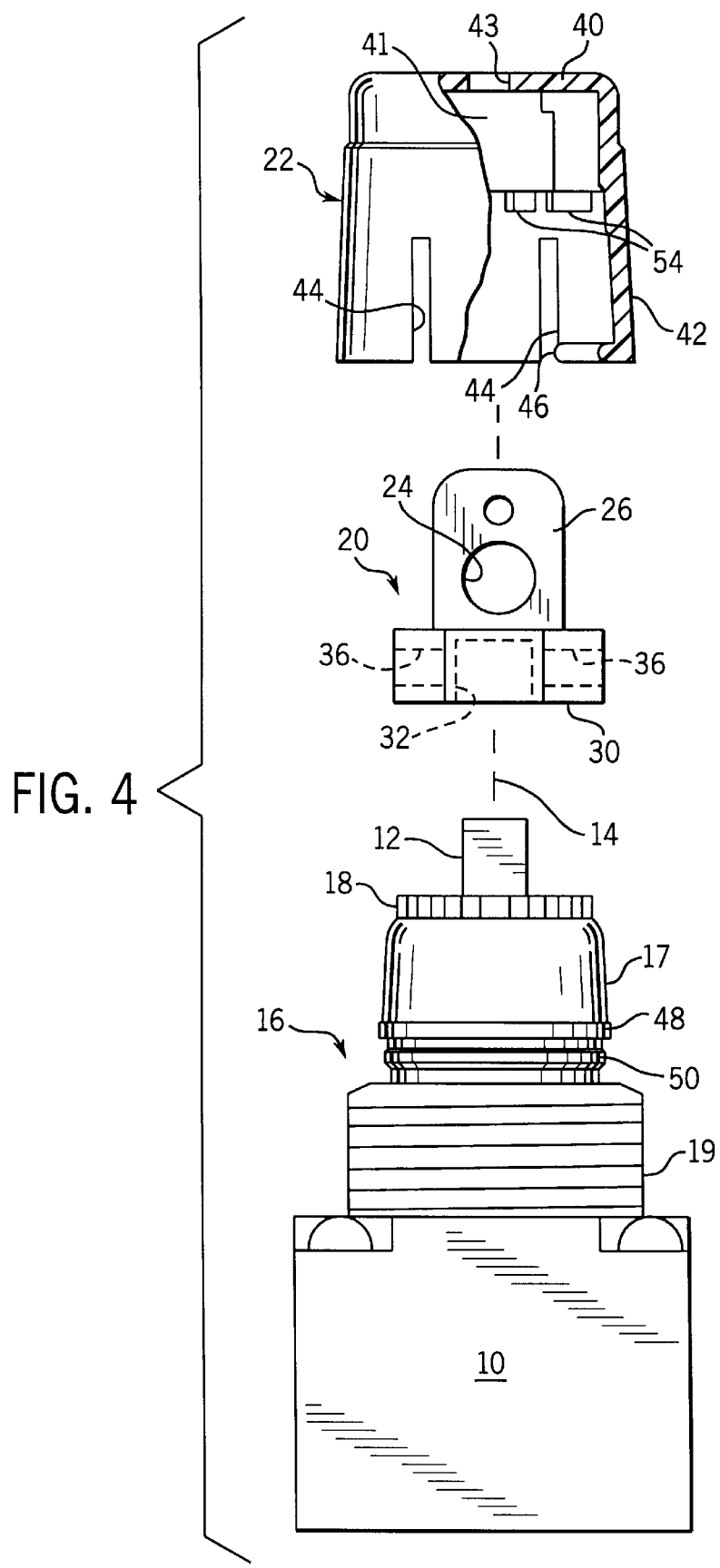
FIG. 4 is an exploded view with parts cut away of the locking device and air regulator valve of FIG. 3.

Referring to FIGS. 3 and 4, the locking device of the present invention cooperates with this valve structure to enable the shaft 12 to be freely rotated to its set position and then locked in that position. The locking device includes a knob 22. As shown best in FIGS. 4 and 6, the linkage 20 has a rectangular coupler 30 with a vertically directed cavity 32 on its bottom surface which fits over the end of the valve shaft 12. Two set screws 34 are disposed in threaded openings 36 that extend laterally from the ends of the coupler 30 to the cavity 32. These set screws 34 are tightened against opposite sides of the valve shaft 12 to securely fasten the linkage 20 thereto.

Figure 5:
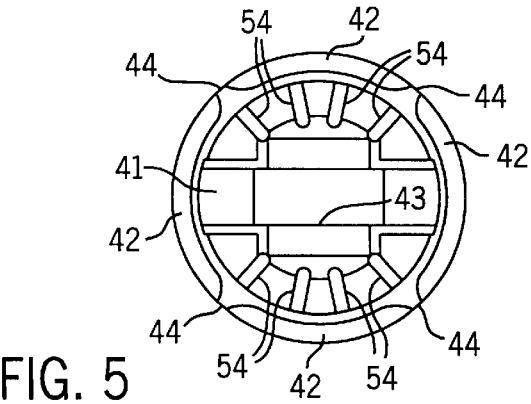
FIG. 5 is a bottom view of a knob which forms part of the locking device.

As shown best in FIGS. 4 and 5, the knob 22 is made of injection molded plastic and is shaped to cover the coupler 30 and the segment end of the valve bushing 16. It includes a circular top wall 40 and a skirt 42 which extends downward from the perimeter of the wall 40. A coupler cavity 41 is formed beneath the top wall 40 to receive the coupler 30 on linkage 20, and a tab opening 43 is formed in the top wall 40 for a lock tab 26 that forms part of the linkage 20. As shown in FIG. 3, a lock opening 24 is formed in the lock tab 26, and the shackle of a padlock 28 may be inserted through the opening 24 to lock the shaft 12.

Figure 6:
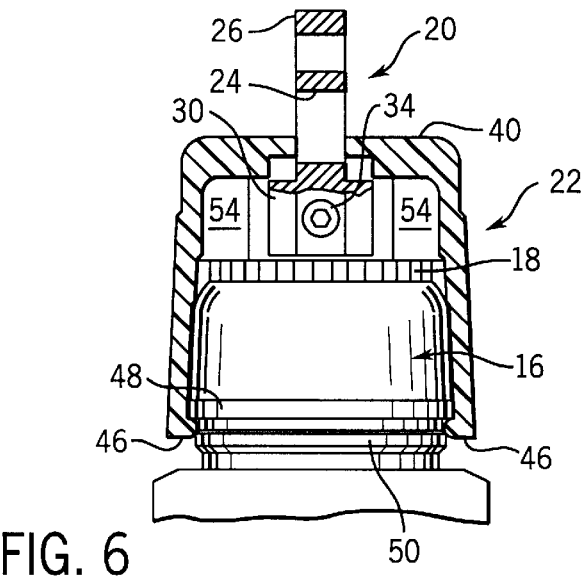
FIG. 6 is a partial view with parts cut away of the air regulator valve of FIG. 3 showing it in an unlocked state.
Figure 7:
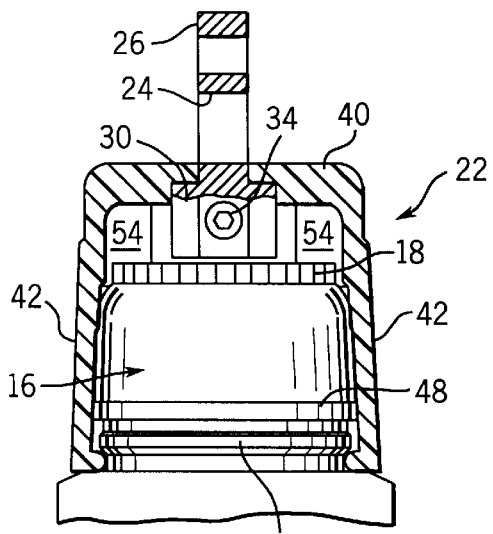
FIG. 7 is a partial view with parts cut away of the air regulator valve of FIG. 3 showing it in a locked state.

The skirt 42 of the knob 22 when in position on the valve bushing 16 extends downward from the end of the bushing 16 to a point just short of its threaded portion 19. Four axially-directed slots 44 are formed in the skirt 42 and extend upward from its lower edge. A radially inward directed lip 46 is integrally formed along the lower edge of two opposing sections of the skirt 42. A retainer ring 48 is formed around the valve bushing 16 and the lips 46 engage the lower edge of this ring 48 to retain the knob 22 in an unlocked (up) position as shown in FIG. 6. A snap ring 50 is also formed around the valve bushing 16 just below the retainer ring 48. The knob 22 may be pushed downward causing the skirt sections to flex radially outward and allow the lips 46 to ride over the snap ring 50. The knob 22 snaps into a locked (down) position shown in FIG. 7 in which the lips 46 engage the lower edge of the snap ring 50. The knob may also be pulled upward to snap into the unlocked (up) position shown in FIG. 6. In the locked (down) position of FIG. 7, the lock opening 24 in the lock tab 26 clears the top wall 40 of the knob 22. In this position, the shackle of the padlock 28 can be passed through the opening 24, and its presence prevents the knob 22 from moving upward to the unlocked (up) position of FIG. 6.

Referring particularly to FIGS. 1 and 5, a set of eight radially directed ribs 54 extend downward from the top wall 40 of the knob 22. The ribs 54 are oriented such that when the knob 22 is snapped downward into the locked (down) position of FIG. 7, they engage the teeth 18 formed on the top of the valve bushing. This engagement prevents the knob 22 from being rotated around the axis 14 with respect to the valve body 10. The depth of the ribs 54 are set such that when the knob 22 is snapped upward into the unlocked (up) position of FIG. 6, they clear the teeth 18 and the knob 22 is free to rotate with respect to the valve body.

It should be apparent to those skilled in the art that variations are possible from the preferred embodiment without departing from the spirit of the invention. For example, the lock tab 26 may be formed as an integral part of the valve shaft 12. Also, the ribs 54 and teeth 18 may take many forms, as can the detent means formed by the lips 46 and rings 48 and 50.

I claim:

1. In a valve having a rotatable shaft extending from a valve body and surrounded by a bushing, the improvement therein comprising:

a lock tab formed on the end of the shaft and having a lock opening formed therethrough;

a knob coupled to the bushing and rotationally coupled to the shaft, the knob having a top wall with a tab opening through which the lock tab extends, the knob being translatable along the axis of rotation of the shaft between an unlocked position in which it can be rotated about said axis and a locked position in which rib means formed beneath the top wall of the knob engage teeth formed on the bushing to prevent rotation of the knob about said axis; and wherein the lock opening in the lock tab extends above the top wall of the knob when the knob is in said locked position and a lock may be passed through said lock opening to prevent the knob from being translated to its unlocked position.

2. The improvement as recited in claim 1 in which detent means are formed on the bushing and a lip on the knob engages the detent means to retain the knob in either said locked or said unlocked position.

3. The improvement as recited in claim 1 in which the teeth are formed on the end of the bushing in an annular ring around the shaft, and said teeth extend radially outward from the shaft.

4. The improvement as recited in claim 3 in which the rib means is formed on the underside of said top wall as a set of ribs which surround the shaft and extend radially outward therefrom.

5. The improvement as recited in claim 1 in which the lock tab is formed as part of a linkage element that fastens to the end of the shaft.

6. The improvement as recited in claim 5 in which the linkage element includes a coupler, and a cavity is formed in the coupler for receiving the end of the shaft, the linkage element being fastened to the shaft by a set screw which engages the shaft in the cavity.

7. The improvement as recited in claim 1 in which the lock is a shackle on a padlock.

* * * * *